(12) United States Patent
Ramaswamy (10) Patent No.: US 11,192,664 B2
(45) Date of Patent: Dec. 7, 2021

(54) SMART APPLICATION FOR AIRCRAFT PERFORMANCE DATA COLLECTION

(71) Applicant: Hamilton Sundstrand Corporation, Charlotte, NC (US)

(72) Inventor: Sitaram Ramaswamy, West Hartford, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 239 days.

(21) Appl. No.: 16/214,297

(22) Filed: Dec. 10, 2018

(65) Prior Publication Data
US 2020/0180790 A1 Jun. 11, 2020

(51) Int. Cl.
| | |
|---|---|
| *B64F 5/60* | (2017.01) |
| *B64D 45/00* | (2006.01) |
| *G07C 5/00* | (2006.01) |
| *G07C 5/08* | (2006.01) |
| *B64D 11/00* | (2006.01) |
| *H04L 29/08* | (2006.01) |

(52) U.S. Cl.
CPC .............. *B64F 5/60* (2017.01); *B64D 45/00* (2013.01); *G07C 5/008* (2013.01); *G07C 5/085* (2013.01); *B64D 11/0015* (2013.01); *B64D 2045/008* (2013.01); *H04L 67/12* (2013.01)

(58) Field of Classification Search
CPC ......... B64F 5/60; B64D 45/00; B64D 11/005; B64D 2045/008; B64D 11/0015; B64D 2045/0085; B64D 43/00; G07C 5/008; G07C 5/085; H04L 67/12; G08G 5/0004; G08G 5/0013; G08G 5/0021; G08G 5/0026; G08G 5/0091; G08G 5/025
See application file for complete search history.

(56) References Cited

U.S. PATENT DOCUMENTS 6,735,505 B2 * 5/2004 Levine ................... B64D 45/00
701/33.4
7,131,136 B2 * 10/2006 Monroe ............. G08B 13/1966
725/105
(Continued)

FOREIGN PATENT DOCUMENTS

| EP | 3203446 A1 | 8/2017 |
|---|---|---|
| EP | 3229095 A1 | 10/2017 |

(Continued)

OTHER PUBLICATIONS

European Search Report; European Application No. 19214806.2; Filed: Dec. 10, 2019; dated May 11, 2020; 7 pages.

*Primary Examiner* — Angelina Shudy
(74) *Attorney, Agent, or Firm* — Cantor Colburn LLP (57) ABSTRACT

Provided are embodiments including a method, system and computer program product for collecting aircraft performance data using smart applications. Some embodiments include receiving sensor data from one or more sensors of one or more user devices associated with an aircraft, and detecting an aircraft event of the aircraft based at least in part on the sensor data. Embodiments can also include analyzing performance of the aircraft by comparing the sensor data with historical data for the aircraft event responsive to detecting the aircraft event, and mapping the performance of the aircraft to the received sensor data.

18 Claims, 5 Drawing Sheets

(56) References Cited

U.S. PATENT DOCUMENTS

| | | | | |
|---|---|---|---|---|
| 8,700,236 | B1* | 4/2014 | Berman | G07C 5/008 701/16 |
| 9,171,473 | B1* | 10/2015 | McNally | G08G 5/0039 |
| 9,310,222 | B1* | 4/2016 | Suiter | G01C 23/005 |
| 9,325,793 | B1* | 4/2016 | Stone | G08G 5/0013 |
| 9,609,288 | B1* | 3/2017 | Richman | B64C 39/024 |
| 9,738,400 | B2* | 8/2017 | Dugan | B64D 47/02 |
| 9,776,731 | B1* | 10/2017 | Lieberman | B64D 45/00 |
| 9,824,593 | B1* | 11/2017 | Kronfeld | G08G 5/0091 |
| 9,955,319 | B2 | 4/2018 | Matus et al. | |
| 10,235,892 | B1* | 3/2019 | Colligan | G08G 5/0026 |
| 10,387,808 | B1* | 8/2019 | Scott | G06Q 50/06 |
| 10,410,291 | B1* | 9/2019 | Binion | G07C 5/008 |
| 10,467,913 | B1* | 11/2019 | Suiter | G08G 5/0091 |
| 10,535,207 | B1* | 1/2020 | Goluguri | H04W 4/40 |
| 10,700,767 | B2* | 6/2020 | Wang | H04B 7/18506 |
| 10,769,953 | B1* | 9/2020 | Salles | G08G 1/123 |
| 11,037,452 | B2* | 6/2021 | Hampel | G08G 5/0091 |
| 2008/0010005 | A1* | 1/2008 | Small | G08G 5/00 701/120 |
| 2008/0041156 | A1* | 2/2008 | Katou | G01P 15/123 73/514.33 |
| 2008/0177428 | A1* | 7/2008 | Fok | G08G 5/0043 701/7 |
| 2009/0210152 | A1* | 8/2009 | Kawa | G01C 21/32 701/532 |
| 2009/0241671 | A1* | 10/2009 | Nomura | G01P 15/123 73/514.36 |
| 2011/0047112 | A1* | 2/2011 | Ketabdar | G06N 3/02 706/20 |
| 2011/0125454 | A1* | 5/2011 | Wengler | H04M 1/72463 702/141 |
| 2011/0241902 | A1* | 10/2011 | Shavit | G08G 5/0026 340/978 |
| 2011/0257818 | A1* | 10/2011 | Ganz | G08G 5/0013 701/14 |
| 2013/0126679 | A1* | 5/2013 | Estkowski | G08G 5/0013 244/190 |
| 2013/0226452 | A1* | 8/2013 | Watts | G01C 21/3407 701/528 |
| 2015/0032296 | A1* | 1/2015 | Girard | G07C 5/008 701/3 |
| 2015/0170524 | A1* | 6/2015 | Stefani | G05D 1/0027 701/120 |
| 2015/0339241 | A1* | 11/2015 | Warner | G06F 13/385 710/74 |
| 2016/0133137 | A1* | 5/2016 | Rencher | G08G 5/0013 701/537 |
| 2017/0200379 | A1* | 7/2017 | Rizzi | G01S 19/16 |
| 2017/0345318 | A1* | 11/2017 | Kim | G08G 5/0052 |
| 2017/0357618 | A1* | 12/2017 | Hamblin | G06Q 10/06 |
| 2017/0365007 | A1* | 12/2017 | Huis | H04W 4/40 |
| 2018/0077538 | A1* | 3/2018 | Matus | G08B 21/04 |
| 2018/0144646 | A1 | 5/2018 | Nitzan et al. | |
| 2018/0162723 | A1* | 6/2018 | Degawa | B81B 7/02 |
| 2018/0205658 | A1* | 7/2018 | Sullivan | H04W 4/42 |
| 2018/0234707 | A1* | 8/2018 | Pujia | H04N 21/4227 |
| 2018/0336743 | A1* | 11/2018 | Lonski | G01S 19/48 |
| 2019/0025338 | A1* | 1/2019 | Matsuura | H01L 29/84 |
| 2019/0147755 | A1* | 5/2019 | Hampel | B64D 43/00 701/14 |
| 2019/0271563 | A1* | 9/2019 | Pandit | G01C 21/20 |
| 2019/0369137 | A1* | 12/2019 | Naruse | G05D 1/0088 |
| 2019/0383610 | A1* | 12/2019 | Torimoto | B81C 3/001 |
| 2020/0385148 | A1* | 12/2020 | Glatfelter | B64F 5/60 |
| 2021/0031940 | A1* | 2/2021 | Guida | G07C 5/0841 |

FOREIGN PATENT DOCUMENTS

| | | |
|---|---|---|
| EP | 3255601 A1 | 12/2017 |
| EP | 3667253 A1 | 6/2020 |
| WO | 2018172666 A1 | 9/2018 |

* cited by examiner

SMART APPLICATION FOR AIRCRAFT PERFORMANCE DATA COLLECTION

BACKGROUND

The present invention relates to sensing devices, and more specifically to smart applications for collecting aircraft performance data.

Aircraft performance is important to ensuring the safety and comfort of its crew and passengers. Responsive to the detection of an aircraft system that is not optimally performing, maintenance and/or replacement of the aircraft system components may be required. The aircraft is equipped with sensors to monitor the conditions associated with the performance. However, many aircraft are limited in the amount of data that is collected due to the limited number of installed sensors and limited space for additional sensors. There may be a need to leverage external sensors to collect performance data of the aircraft.

BRIEF DESCRIPTION

Embodiments include a system for collecting aircraft performance data using smart applications. The system includes an aircraft, one or more user devices operably coupled to the aircraft, wherein the one or more devices comprises one or more sensors configured to collect sensor data of the aircraft, and a server comprising a storage medium, the storage medium being coupled to a processor. The processor can be configured to receive sensor data from the one or more sensors of the ones or more user devices associated with the aircraft, and detect an aircraft event of the aircraft based at least in part on the sensor data.

In addition to one or more of the features described herein, or as an alternative, further embodiments include a processor that is further configured to analyze performance of the aircraft by comparing the sensor data with historical data for the aircraft event responsive to detecting the aircraft even, and map the performance of the aircraft to the received sensor data.

In addition to one or more of the features described herein, or as an alternative, further embodiments include sensors are configured to collect vertical acceleration information of the aircraft.

In addition to one or more of the features described herein, or as an alternative, further embodiments include detecting aircraft events that are associated with at least one of in-flight turbulence characteristics, hard landing characteristics, or air management characteristics.

In addition to one or more of the features described herein, or as an alternative, further embodiments include an aggregator node that is configured to aggregate sensor data from the one or more sensors, wherein the aggregator node is at least one of a user device or a gateway device.

In addition to one or more of the features described herein, or as an alternative, further embodiments include sensors devices that are configured to upload the sensor data to the server in real-time or after a period of time.

In addition to one or more of the features described herein, or as an alternative, further embodiments include a server that is configured to anonymize the sensor data from one or more user devices.

In addition to one or more of the features described herein, or as an alternative, further embodiments include one or more user devices that are configured to synchronize a sampling rate and processing rate of the one or more sensors for collecting the sensor data.

In addition to one or more of the features described herein, or as an alternative, further embodiments include one or more user devices that is at least one of a mobile phone, smart watch, or tablet.

Embodiments also include a computer-implemented method for collecting aircraft performance data using smart applications. The computer-implemented method includes receiving, by a server, sensor data from one or more sensors of one or more user devices associated with an aircraft, and detecting an aircraft event of the aircraft based at least in part on the sensor data. The computer-implemented method also includes analyzing performance of the aircraft by comparing the sensor data with historical data for the aircraft event responsive to detecting the aircraft event, and mapping the performance of the aircraft to the received sensor data.

In addition to one or more of the features described herein, or as an alternative, further embodiments include one or more sensors that are configured to collect vertical acceleration information of the aircraft.

In addition to one or more of the features described herein, or as an alternative, further embodiments include detecting aircraft events that are associated with at least one of in-flight turbulence characteristics, hard landing characteristics, or air management characteristics.

In addition to one or more of the features described herein, or as an alternative, further embodiments include aggregating, by an aggregator node, sensor data from the one or more sensors, wherein the aggregator node is at least one of a user device or a gateway device.

In addition to one or more of the features described herein, or as an alternative, further embodiments include uploading sensor data from the one or more sensors devices to the server in real-time or after a period of time.

In addition to one or more of the features described herein, or as an alternative, further embodiments include anonymizing, by a server, the sensor data from one or more user devices.

In addition to one or more of the features described herein, or as an alternative, further embodiments include synchronizing a sampling rate and processing rate of the one or more sensors for collecting the sensor data.

In addition to one or more of the features described herein, or as an alternative, further embodiments include synchronizing the sampling rate and processing rate of the one or more sensors of the one or more user devices based at least in part on the available energy of the one or more devices or a sum total of energy available in a network of the one or more devices.

In addition to one or more of the features described herein, or as an alternative, further embodiments include providing a reward to users of the one or more user devices transmitting the sensor data to the server.

Embodiments also include a computer program product for collecting aircraft performance data using smart applications. The computer program product includes a computer-readable storage medium having stored thereon program instructions executable by a processor to cause the processor to receive sensor data from one or more sensors of one or more user devices associated with an aircraft, wherein the one or more sensors are configured to collect vertical acceleration information of the aircraft, and detect an aircraft event of the aircraft based at least in part on the sensor data, wherein the aircraft event is associated with at least one of in-flight turbulence characteristics, hard landing characteristics, or air management characteristics. The instructions are executable by the processor to cause the processor to analyze performance of the aircraft by comparing the sensor data with historical data for the aircraft event responsive to detecting the aircraft event, and map the performance of the aircraft to the received sensor data.

In addition to one or more of the features described herein, or as an alternative, further embodiments include instructions are further executable by the processor to cause the processor to synchronize a sampling rate and processing rate of the one or more sensors for collecting the sensor data.

Technical effects of embodiments of the present disclosure include leveraging multiple external data sources such as mobile user devices to create a more robust data source to identify key signals/features to improve analytic algorithms to improve the use, the life, and the value of system components.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Aircraft are equipped with aircraft-level sensors to collect data during take-off, landing, and other phases of flight. For example, an aircraft may have one or more aircraft-level sensors that are physically installed on the aircraft to collect vertical acceleration data to gauge in-flight turbulence data or hard landing scenarios. In addition, these aircraft-level sensors may require a dedicated communication channel to provide the collected data to a collection node such as a server for further processing and/or storage. The aircraft-level devices are oftentimes expensive and are dedicated to a particular aircraft.

Current approaches may suffer from existing limitations such as being dedicated to a specific aircraft data acquisition related sensors can be expensive and difficult to deploy. The amount of data that can be collected by the aircraft-level sensors are limited.

Since the passengers and crew often carry devices that are equipped with a variety of sensors, they can provide additional external data points to analyze an aircraft event. For example, many passengers have mobile devices that are equipped with biometric sensors, accelerometers, gyrometers, etc. The amount of additional data that can be collected is only limited by the number of devices that are carried by the passenger and crew. The more data that can be collected provides more reliable data.

The techniques described herein leverages the sensor data collected by a network of mobile devices. By leveraging a plurality of data collection sources more robust data can be used for analysis. For example, outlier data can be identified by comparing it to the other data that has been collected. The mobility-based level devices carried by the passenger and crew can be used to supplement the data that is collected by the aircraft-level devices without interfering with the dedicated communication channel for the aircraft-level devices.

Figure 1:
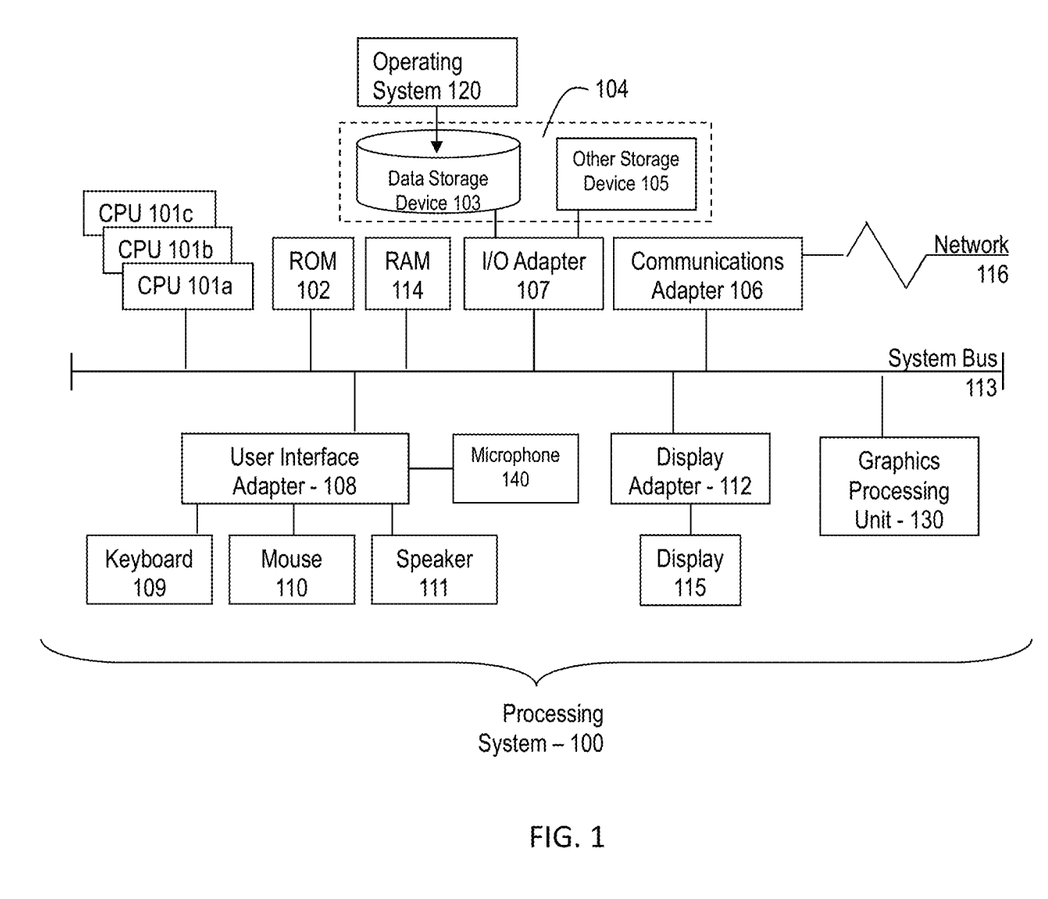
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a data storage device 103 and/or other storage device 105 or any other similar component. I/O adapter 107, data storage device 103, and other storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, speaker 111, and microphone 140 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In other embodiments, a touchscreen interface can be included that can be used to provide a virtual keyboard or other touchscreen functions. In another embodiment, gestures or voice can be used to provide input/output capability. In one embodiment, a portion of system memory 114 and mass storage 104 collectively store an operating system to coordinate the functions of the various components shown in FIG. 1.

Figure 2:
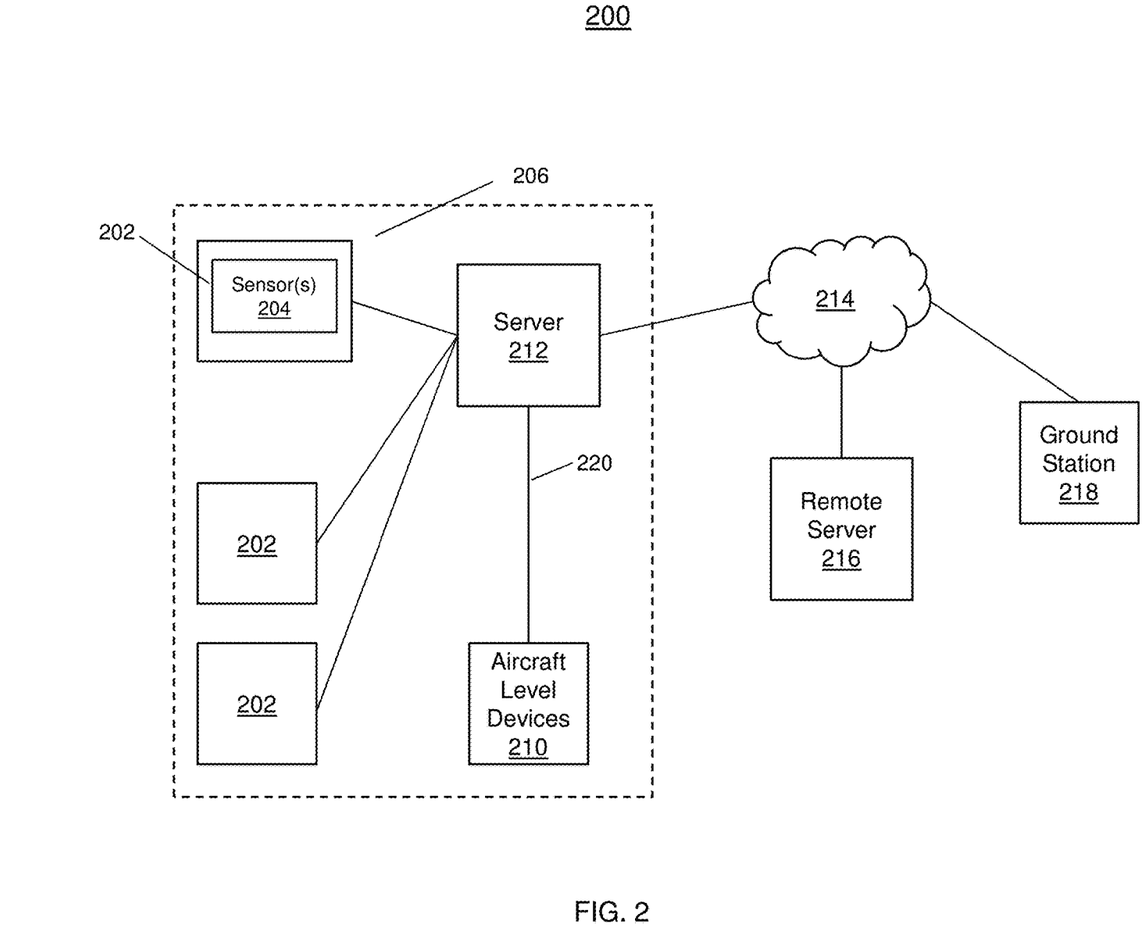
FIG. 2 depicts a system for collecting aircraft performance data using smart applications in accordance with one or more embodiments.

Now referring to FIG. 2, a system 200 for collecting aircraft performance data using smart applications is shown. The system 200 includes user device(s) 202 which are mobility-based devices. The user devices 202 include mobile device, smartphones, laptops, tablets, etc. The mobility-based devices including Fitbits, biosensors, and the like.

The user devices 202 are equipped with sensors 204. In one or more embodiments, the accelerometers on the mobile cell phones carried with passengers on the aircraft are used to collected data. For example, the data can be used to detect in-flight turbulence signatures, hard landing signatures, etc. In other embodiments, the biosensors of a user devices such as a smart watch or Fitbit can be used to monitor a passengers comfort by detecting a heart rate or temperature and correlate them to in-flight turbulence, aircraft air management system, etc.

One or more components of the system 200 can be implemented in a vehicle such as and aircraft 206. In other examples, the vehicle can include automobiles, ships, locomotives, etc. to track irregular acceleration patterns, vibration patterns, passenger conditions, among other information to improve safety, maintenance, and passenger comfort.

In one or more embodiments, the aircraft-level devices 210 can include motion sensors, location sensors, etc. that are physically installed on the aircraft 206. The aircraft-level devices 210 are configured to detect the accelerations patterns, vibration patterns, etc. The velocity characteristics and the acceleration characteristics of the aircraft can indicate the in-flight turbulence or hard landing experienced by the aircraft 206. The on-aircraft or in-airport based network of mobile devices can be used for robust data collections. Improve the accuracy by collecting data from the network of devices.

As shown, FIG. 2 depicts the user devices 202 are operably coupled to a server 212 which is configured to receive, analyze, and transmit the data to one or more sources over the network 214. In one or more embodiments, the server 212 can be implemented by the system 100 shown in FIG. 1. The user devices 202 can communicate over wired/wireless to the server where the communication channel can include Bluetooth, Wi-Fi, cellular channels, and the like. The server 212 can be located on the aircraft 206 or located external to the aircraft 206 in a remote location such as remote server 216.

The server 212 can be configured to exchange data with a ground station 218. In one or more embodiments, the aircraft-level devices 210 communicate over a channel 220 with the server 212. The data collected by the user devices 202 are configured to communicate with the server 212 over channels that are independent that of the aircraft-level devices 210. The techniques described herein, allow the traditional communication channel 220 to be bypassed (including onboard collection) to communicate with the ground station 218.

In one or more embodiments, the user devices 202 can be triggered to collect sensor data based on an aircraft event such as detecting in-flight turbulence or an aircraft landing. For example, triggering mechanisms can include detecting a descent of the aircraft in the event the aircraft is landing. Also, detection of in-flight turbulence can be used to trigger the device to begin monitoring the sensor data.

In one or more embodiments, the data collection and computation can be performed in real-time or in a batch mode. For example, the batch mode can occur upon landing where the data is uploaded to the server 212. In some embodiments, the data can be uploaded to a server after a period or once terrestrial communication networks become available. For example, the data can be uploaded from the device when the airport Wi-Fi network, hotel Wi-Fi network, or home Wi-Fi network is available. In a different example, a cellular or mobile network can be used to upload the data. In another example, the data can be uploaded when the user device is no longer subject to roaming charges. It should be understood that the examples are non-limiting and other techniques can be used to trigger the data to be transferred from the user devices to the server.

The collection of information from one or more user devices can be combined to improve the accuracy of the measured data. In another embodiment, the sampling rate at which the sensors 204 collect data and/or process data can be modified based on the remaining power of the user devices 202 according to configurable thresholds. For example, the user devices 202 can operate in a low power mode where data is collected at longer intervals compared to a normal operating mode. To conserve energy, if multiple user devices 202 are detected, each of the user devices 202 can be configured to perform sensing of a condition in a staggered fashion. A lower sampling rate can be configured for the user devices 202. For example, if six user devices 202 are available, a pair of devices can be configured to sample the data in a first interval, a second pair of devices can be configured to sample data in a second interval, and a third pair of devices can be configured to sample data in a third interval. It should be understood that a different number of user devices 202 and synchronization patterns can be used among the user devices 202.

The collected data can be used to improve the accuracy of the data by filtering extraneous data after comparing the collected data with other sources of data. In other embodiments, the collected data can be processed by one of the user device 202, server 212, remote server 216, or ground station 218 to filter any outlier data. This can be determined by comparing the data received from each mobility-based device and determining a baseline of data such as an average and remove the data that is outside of a margin of error. The margin of error can be selected to be 0.5%, 1%, 2%, etc. In addition, the margin of error can be determined based on the associated application.

In a different embodiment, the collected data from the user devices 202 can be compared to data collected from the aircraft-level devices 210. Any data that is outside of a range can be determined to be outlier data and removed from further consideration.

A known pattern of landing data, such as vertical acceleration data, based on the historical data for the aircraft 206 can be used to compare a current landing data. Variations in the comparison can indicate that there is an issue with the landing gear system and maintenance or replacement of a component may be required. In an air management example, the temperature setpoint for the cabin can be compared to the temperature data from the user devices 202 of passengers in the cabin to determine if the air management system should be modified to achieve passenger comfort. Also, in another example, the user devices 202 can be used to monitor a passenger's heart rate during an in-flight turbulence event to determine passenger confidence in the aircraft crew. An accelerated heart rate for an extended period of time can indicate lower confidence than an average detected heart rate. This data can be used to re-route the aircraft 206 in the event similar turbulence is forecasted in the future to avoid passenger discomfort or anxiety. In one or more embodiments, the results can be used to increase the safety of the passengers by rerouting a path.

In one or more embodiments, the sensor data from the user devices 202 can be mapped to a particular aircraft using the geo-location information of the user devices 202 or the aircraft 206.

Figure 3:
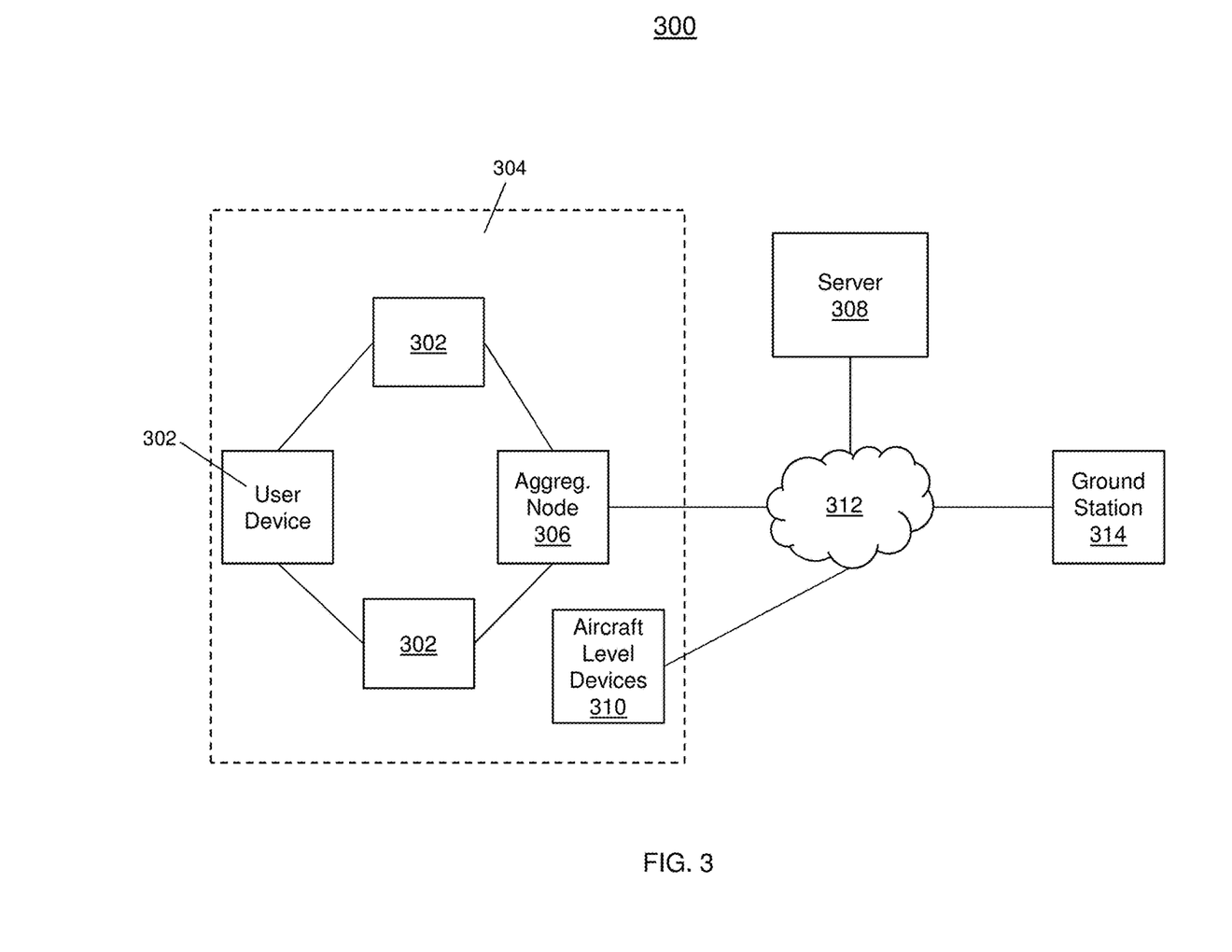
FIG. 3 depicts another system for collecting aircraft performance data using smart applications in accordance with one or more embodiments.

Now referring to FIG. 3, another example of a system 300 for collecting data in accordance with one or more embodiments is shown. The system 300 includes user devices 302 similar to that shown in FIG. 2. The user devices 302 are equipped with sensors (not shown) for collecting data related to the vehicle 304. The user devices 302 are configured in a mesh network or peer-to-peer network. In one or more embodiments, the user devices 302 are configured to perform a distributed computation and processing of the data. In another embodiment, a central node can be used to perform the computation such as an aggregator node 306.

In one or more embodiments, an aggregator node 306 (noted as "Aggreg. Node 306") is used to collect the data from the plurality of user devices 302. The aggregator node 306 can be a user device 306 that is performing aggregator functions or a gateway node that functions to aggregate the data prior to communicating the data to another device/system. The aggregator node 306 can be configured with an anonymizer module that can remove the user identifier data from each user device 302 before processing the data by the system 300.

As shown in FIG. 3, the aggregator node 306 is configured to communicate with the server 208 to further process the data. In one or more embodiments, the server 308 can be an onboard server or a remote server that is configured to communicate with the aircraft-level devices 310 and the ground station 314 over a network 312. It should be understood the devices of the system 200 can be arranged in various configurations and are not limited by the non-limiting examples disclosed herein.

Figure 4:
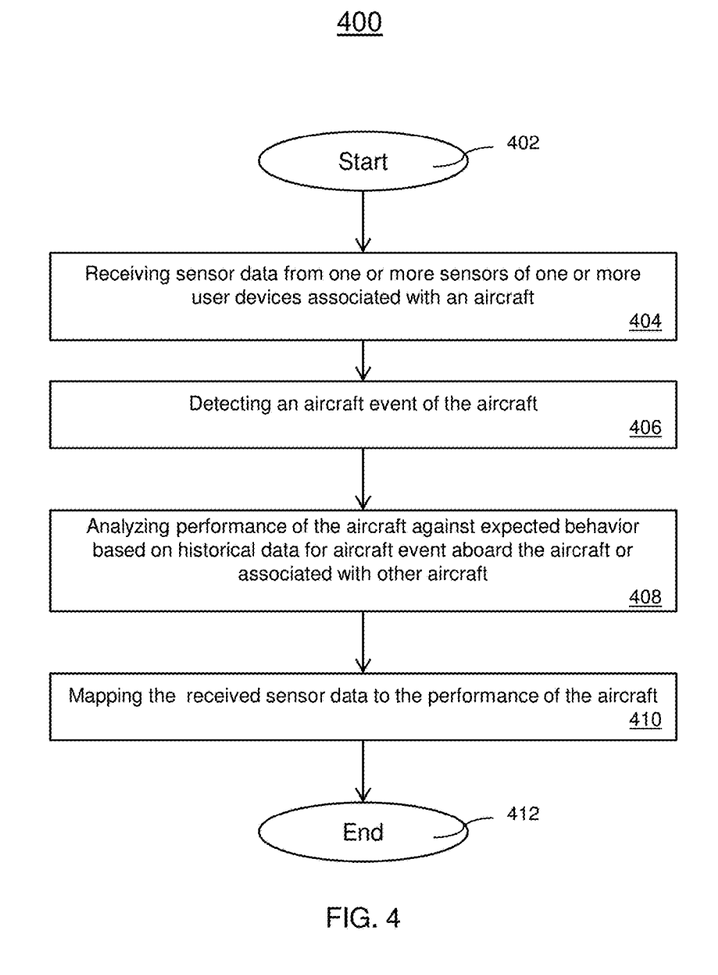
FIG. 4 depicts a flowchart of a method for collecting aircraft performance data using smart applications in accordance with one or more embodiments.

Now referring to FIG. 4, a flowchart of a method 400 for collecting aircraft performance data using smart applications is shown. The method 400 begins at block 402 and proceeds to block 404 which provides for receiving sensor data from the one or more sensors associated with the aircraft.

At block 406 the method 400 includes detecting an aircraft event of the aircraft. In one or more embodiments, the aircraft event, such as landing or in-flight turbulence, can trigger the sensor devices to begin collecting data.

Block 408 provides responsive to detecting the aircraft event, analyze performance of the aircraft by comparing the sensor data with historical data for the aircraft event. The comparison can indicate abnormalities in the pattern of collected sensor data which can be related to wearing system components. In one or more embodiments, the information is used to schedule replacement of system components in the event of a hard landing or rerouting a flight path in the event of detecting future in-flight turbulence.

At block 410, the method 400 provides for mapping the performance of the aircraft to the received sensor data. Mapping the current sensor conditions onto the performance of the aircraft can be used to inform an operator when to take action based on the historical data that has been collected over a period of time. The method 400 can end at block 412 or alternatively, in different embodiments, the method 400 can be used to provide inputs to aircraft controllers or other systems.

In one or more embodiments, users operating the user devices to transmit sensor data to the server can be rewarded for participating in the data collection and processing. For example, a digital coupon, token, code, etc. can be transmitted to the user device from the server where the user can redeem various rewards. Rewards can include a direct one-time payment or periodic payments. Also payments can also be provided to the user according to a per usage basis, power, the data communicated, and the usefulness of the insights gained from the data. Dynamic payments can be based on how many devices are on board the aircraft or the level of demand for the data. Payments can also be based on a lottery such as providing a prize to a single user per 100 use events. In addition, other non-monetary rewards can be redeemed such as gifts, free applications, flights, to name a few. It should be understood that other techniques can be used to provide a redeemable reward to the user.

Figure 5:
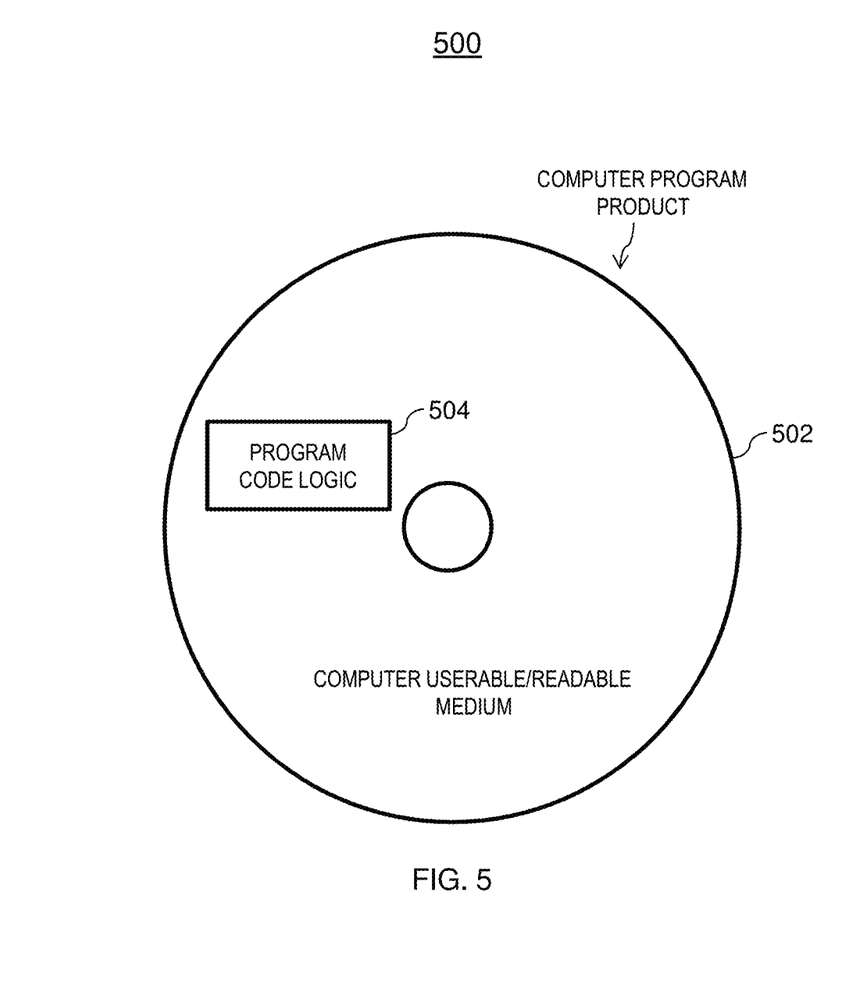
FIG. 5 depicts a computer program product for implementing the method for collecting aircraft performance data using smart applications in accordance with one or more embodiments.

Referring now to FIG. 5, a computer program product 500 in accordance with an embodiment that includes a computer-readable storage medium 502 and program instructions 504 is generally shown.

The technical effects and benefits include overcoming dedicated aircraft sensors, limited sampling rates, and limited communication barriers/bandwidth. The technical effects and benefits include techniques to allow for accessing additional data in a timely, cost-effective, and conflict-free manner.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. Embodiments can include mobile devices on the network that may be able to load specific program codes on other devices in the mesh network. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system for collecting aircraft performance data using smart applications, the system comprising:
    an aircraft comprising aircraft-level devices configured to detect an aircraft event;
    one or more user devices operably coupled to the aircraft, wherein the one or more devices comprises one or more sensors configured to collect sensor data of the aircraft and detect the aircraft event, wherein the one or more sensors are configured to collect vertical acceleration information of the aircraft; wherein the one or more sensors are triggered to collect the sensor data of the aircraft based on detecting the aircraft event;
    transmitting the sensor data to a server, wherein the sensor data is transmitted over a channel that is independent of a channel used to transmit data for the aircraft-level devices;
    the server comprising a storage medium, the storage medium being coupled to a processor, wherein the processor is configured to:
        receive sensor data from the one or more sensors of the ones or more user devices associated with the aircraft; and
        map the sensor data to the performance of the aircraft, wherein the aircraft is operated based at least in part on the sensor data.

2. The system of claim 1, wherein mapping the sensor data to the performance comprises analyzing performance of the aircraft by comparing the sensor data with historical data for the aircraft event responsive to detecting the aircraft event.

3. The system of claim 1, wherein the aircraft event is associated with at least one of in-flight turbulence characteristics, hard landing characteristics, or air management characteristics.

4. The system of claim 1, further comprising an aggregator node that is configured to aggregate sensor data from the one or more sensors, wherein the aggregator node is at least one of a user device of the one or more devices or a gateway device.

5. The system of claim 1, wherein the one or more sensors devices are configured to upload the sensor data to the server in real-time or after a period of time.

6. The system of claim 1, wherein the server is configured to anonymize the sensor data from one or more user devices.

7. The system of claim 1, wherein the one or more user devices are configured to synchronize a sampling rate and processing rate of the one or more sensors for collecting the sensor data.

8. The system of claim 1, wherein the one or more user devices is at least one of a mobile phone, smart watch, or tablet.

9. A computer-implemented method for collecting aircraft performance data using smart applications, the computer-implemented method comprising:
    receiving, by a server, sensor data from one or more sensors of one or more user devices associated with an aircraft, wherein the aircraft comprises aircraft-level devices configured to detect an aircraft event, wherein the sensor data is received over a channel that is independent of a channel used to receive data for the aircraft-level devices;
    detecting an aircraft event of the aircraft based at least in part on the sensor data, wherein the one or more sensors are triggered to collect the sensor data of the aircraft based on detecting the aircraft event, wherein the one or more sensors are configured to collect vertical acceleration information of the aircraft;
    responsive to detecting the aircraft event, analyzing performance of the aircraft by comparing the sensor data with historical data for the aircraft event; and
    mapping the performance of the aircraft to the sensor data, wherein the aircraft is operated based at least in part on the sensor data.

10. The computer-implemented method of claim 9, wherein the aircraft event is associated with at least one of in-flight turbulence characteristics, hard landing characteristics, or air management characteristics.

11. The computer-implemented method of claim 9, further comprising aggregating, by an aggregator node, sensor data from the one or more sensors, wherein the aggregator node is at least one of a user device of the one or more devices_or a gateway device.

12. The computer-implemented method of claim 9, further comprising uploading sensor data from the one or more sensors devices to the server in real-time or after a period of time.

13. The computer-implemented method of claim 9, wherein the server is configured to anonymize the sensor data from one or more user devices.

14. The computer-implemented method of claim 9, wherein the one or more user devices are configured to synchronize a sampling rate and processing rate of the one or more sensors for collecting the sensor data.

15. The computer-implemented method of claim 14, wherein the sampling rate and processing rate of the one or more sensors of the one or more user devices is based at least in part on the available energy of the one or more devices or a sum total of energy available in a network of the one or more devices.

16. The computer-implemented method of claim 9, further comprising providing a reward to users of the one or more user devices transmitting the sensor data to the server.

17. The computer program product of claim 16, wherein the instructions are further executable by the processor to cause the processor to synchronize a sampling rate and processing rate of the one or more sensors for collecting the sensor data.

18. A computer program product for collecting aircraft performance data using smart applications, the computer program product comprising:

a computer-readable storage medium having stored thereon program instructions executable by a processor to cause the processor to:
  receive sensor data from one or more sensors of one or more user devices associated with an aircraft, wherein the one or more sensors are configured to collect vertical acceleration information of the aircraft, wherein the aircraft comprises aircraft-level devices configured to detect an aircraft event, wherein the sensor data is received over a channel that is independent of a channel used to receive data for the aircraft-level devices;
  detect the aircraft event of the aircraft based at least in part on the sensor data, wherein the one or more sensors are triggered to collect the sensor data of the aircraft based on detecting the aircraft event, wherein the aircraft event is associated with at least one of in-flight turbulence characteristics, hard landing characteristics, or air management characteristics;
  responsive to detecting the aircraft event, analyze performance of the aircraft by comparing the sensor data with historical data for the aircraft event; and
  map the performance of the aircraft to the sensor data, wherein the aircraft is operated based at least in part on the sensor data.

\* \* \* \* \*